C. W. UNDERWOOD.
TRUCK.
APPLICATION FILED DEC. 18, 1909.
978,517.
Patented Dec. 13, 1910.
3 SHEETS—SHEET 2.
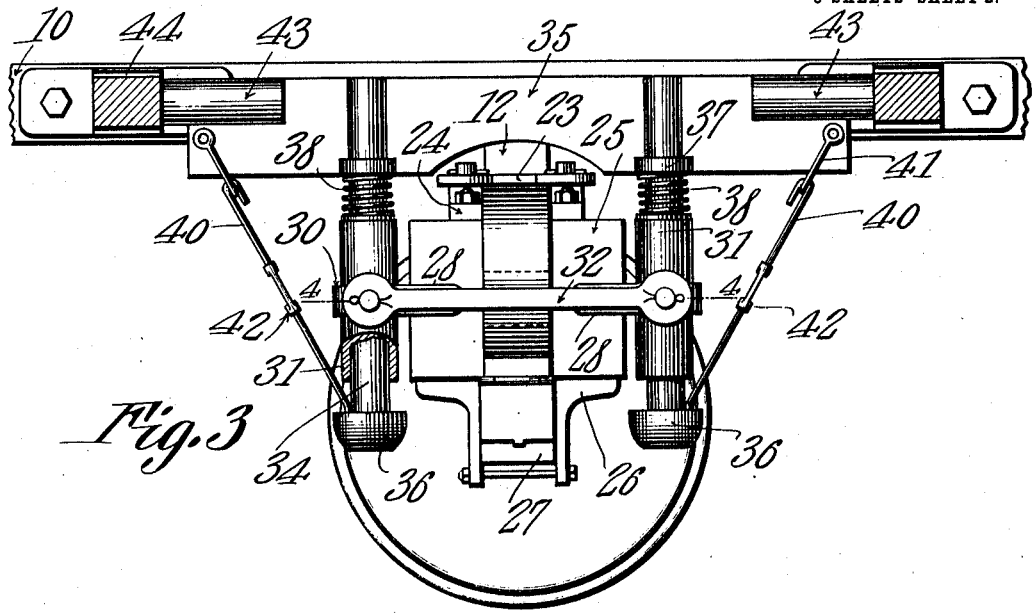
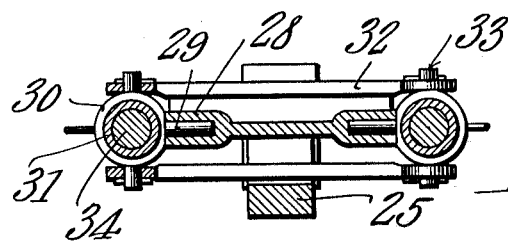
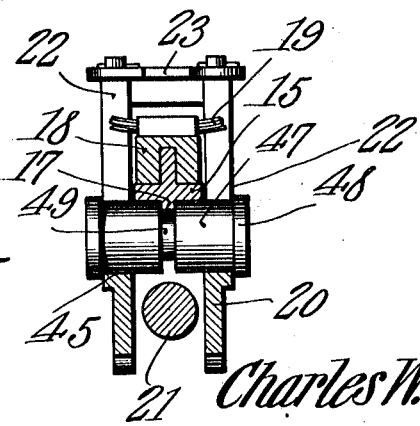
Inventor
Charles W. Underwood.
Witnesses
By 
Attorneys C. W. UNDERWOOD.
TRUCK.
APPLICATION FILED DEC. 18, 1909.
978,517.
Patented Dec. 13, 1910.
3 SHEETS—SHEET 3.
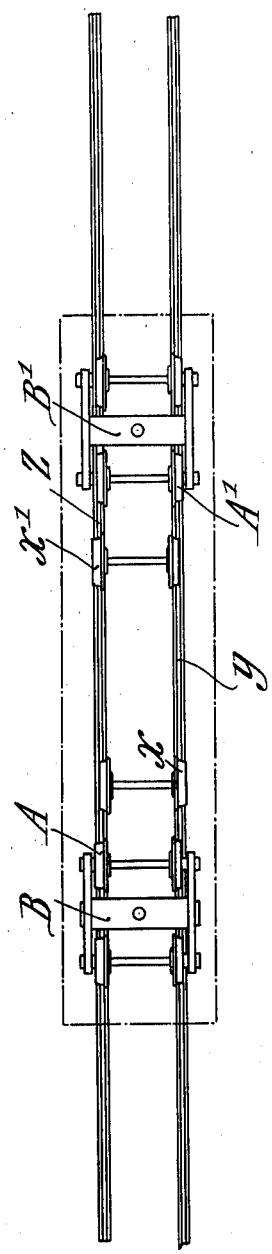
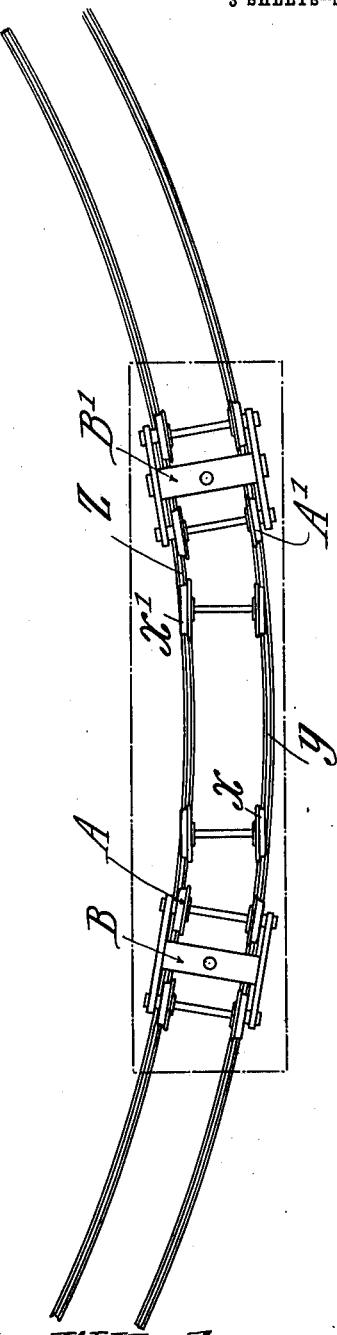
Inventor
Charles W. Underwood.

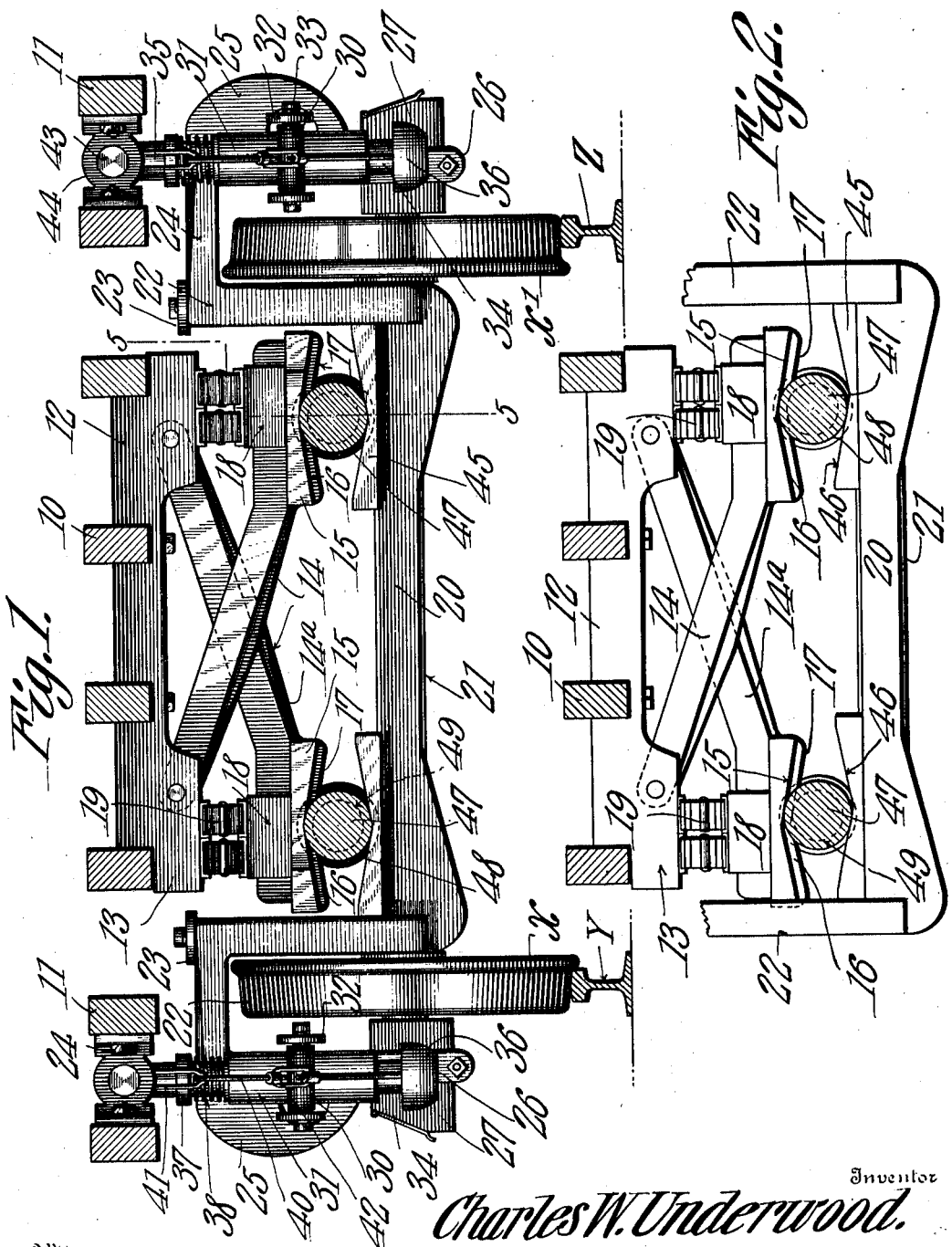

UNITED STATES PATENT OFFICE.

CHARLES W. UNDERWOOD, OF CROWLEY, LOUISIANA, ASSIGNOR OF ONE-FOURTH TO F. S. BUTTON AND ONE-FOURTH TO L. L. REYNAUD, OF CROWLEY, LOUISIANA.

TRUCK.

978,517.  Specification of Letters Patent.  Patented Dec. 13, 1910.

Application filed December 18, 1909. Serial No. 533,777.

*To all whom it may concern:*

Be it known that I, CHARLES W. UNDERWOOD, a citizen of the United States, residing at Crowley, in the parish of Acadia and State of Louisiana, have invented a new and useful Truck, of which the following is a specification.

The present invention aims to improve generally the construction of running gear for railway cars and the improvements are directed more specifically to the construction and arrangement of the trucks.

The primary aim of the invention is to obviate the wabbling from side to side of the car which with the present construction of trucks occurs both on straight and curved lines of track.

In carrying out the invention a secondary truck is provided and is located one adjacent each of the main trucks and these secondary trucks are so constructed that the weight of the car upon them will result in their wheels and axles being moved so as to bring one wheel into engagement, at its flange, with the corresponding track rail. The supplemental trucks of each car are arranged in opposition, that is to say, the trucks are reversed one with respect to another so that one wheel of one truck will bear against one track rail whereas the opposite or non-corresponding wheel of the other truck will bear against the other rail, resulting in the corresponding wheels of the corresponding main trucks bearing against the corresponding track rails. In other words, whereas ordinarily the wheels at one side of a car will come into contact with the corresponding track rail and the car will be thrown bodily to bring the wheels at the other side thereof into contact, at their flanges, with the other track rail thereby producing a wabbling from side to side, the supplemental trucks contemplated by the present invention will, as stated, cause the main truck wheels to fill in, so to speak, the space between the track rails so as to obviate this play or movement of the car. The construction and arrangement of the supplemental trucks as will be presently explained, is such as to also insure against the usual jolting in rounding a curve.

In the accompanying drawings, Figure 1 is a transverse sectional view through a portion of the running gear of a car illustrating the normal condition of one of the supplemental trucks. Fig. 2 is a similar view but showing the condition of the truck before weight is imposed thereon. Fig. 3 is a side elevation of one of the trucks. Fig. 4 is a horizontal sectional view on the line 4—4 of Fig. 3. Fig. 5 is a vertical sectional view in a plane from front to rear on the line 5—5 of Fig. 1. Fig. 6 is a diagrammatic view showing the positions of all of the wheels with respect to the track rails and on a straight line of track. Fig. 7 is a similar view but illustrating the positions of the wheels when on a curve.

In the drawings, the sills of the car are indicated by the numeral 10 except two side sills at each side of the car which are indicated by the numeral 11. These latter sills 11 are supported by the supplemental trucks whereas the sills 10 are supported upon a casting 12 which is bolted to them and at each end is formed with a depending open portion of box like structure, indicated by the numeral 13. Between the walls of each of these open portions there is pivoted the outer upper end of an arm 14 it being understood that there are two such arms embodied in the structure of each truck. The arms are arranged in crossed relation as illustrated in Figs. 1 and 2 of the drawings, and one of the arms, indicated specifically by the reference numeral 14ª is of greater length than the other arm for a purpose which will be presently explained. Each of the arms is formed at its outer end, which end is also its lower end, with a head indicated by the numeral 15 and has its under face concaved as at 16 and formed with a continuous rib 17 which is located midway between the sides of the head and extends from end to end thereof. Straddling each of the arms at its said end and above the head is a saddle 18 between which and the corresponding end of the casting 12 is interposed a bolster spring 19, these springs serving to cushion the said elements 12 and 14. The saddles 18 are free to slide upon their respective arms 14 so that when weight is imposed upon the sills 10, the springs 19 will cushion the elements between which they are interposed without being subjected to torsional strain.

The truck body is in the nature of a casting which is indicated by the numeral 20 and straddles the axle 21 of the truck. At each end, this body 20 is formed or provided with a pair of standards 22 which at their upper ends are connected by a tie plate 23 and these standards have projecting from their upper ends spaced arms 24 which at their extremities rest upon and are secured to a casting 25 which is constructed as at 26 to straddle the respective journal box 27 in which boxes the ends of the axle are journaled. This casting 25 is in effect a saddle and as will now be explained, supports the sills 11. At each side, the casting 25 is formed with a socket 28 which receives a stud 29 projecting from a collar 30 integral with a sleeve 31 at a point approximately midway between the ends thereof, the said sleeve being in this manner supported for rocking movement. To hold the sleeves, there being two provided in connection with each casting 25, in assembled relation to the casting and in connected relation with respect to each other, tie bars 32 are provided, and these bars at their ends are connected with studs 33 projecting laterally from the collars 30 at diametrically opposite points, it being understood that two such tie bars are provided for connecting each pair of sleeves. Slidably mounted in each of the sleeves 30 is a stem 34 and these stems are integral with or secured to a frame bar 35 and depend therefrom in parallelism. Each stem is provided at its lower end with a head 36 and mounted upon each stem and bearing between a collar 37 thereon at the upper end thereof, and the upper end of the respective sleeve is a spring 38 which serves to cushion the downward movement of the stem in the sleeve.

Braces 40 are secured at their lower ends one to each of the heads 36 and connect at their upper ends each with a clevis 41 suspended from the frame bar 35 at the end thereof. Each of these braces 40 is preferably formed of two sections connected by a turn buckle 42 or any other suitable slack-adjusting device. At each end, the frame bar 35 is formed with a trunnion 43 which projects in the direction of the long dimension of the bar, and seats in a sleeve 44 secured to and supported between the respective pair of beams 11.

From the foregoing it will be readily understood that not only may the beams 11 yield downwardly with respect to the truck body 20 but also that they may have lateral movement or play with respect thereto which is made possible by oscillation of the castings 25; also they may yield simultaneously downwardly and laterally.

The truck casting 20 is formed at each end with bearing portions 45 the upper faces of which are concaved as indicated by the numeral 46. Interposed between each of the said portions 45 and the corresponding bearing head 15 is a roller 47 which at each end is formed with a flange 48 contacting with the outer faces of the said portions 45 and preventing front to rear displacement of the roller with respect to these portions. The roller is further formed, between its ends, with a circumscribing groove 49 in which seats the rib 17 of the said corresponding head 15, it being understood that displacement of the heads with respect to the rollers is in this manner obviated. While it has been stated above that the under faces of the heads 15 and the upper faces of the portions 45 are concave, they are not concave in the arc of a circle but each have synclinal surfaces of equal area. As a consequence, the tendency is for the rollers to seat in the deepest portions of the concavities. The arm 14$^a$, being longer however than the arm 14, this tendency is overcome when no weight is imposed on the sills 10. Under normal traffic conditions however, the weight of the car body and its contents on these sills, results in an even greater tendency being exerted by the rollers to seat in the deepest portions of the concavities, and inasmuch as the only resistance offered to this tendency is of yielding character, the wheel at that side of the truck at which the free end of the arm 14$^a$ is located will be forced into engagement at its flange with the side of the tread of the adjacent rail. So, by providing each car with two of the trucks, for example, and relatively reversing these trucks, the wheel X in Fig. 1 of the drawings will bear against the rail Y whereas the wheel of the other truck corresponding to the wheel indicated by X' in Fig. 1 will be forced against the rail Z and wabbling of the car from side to side will be effectually prevented. That this is true will be observed from inspection of the diagrammatic views and particularly Fig. 6 wherein the wheel X is illustrated as bearing against the rail Y and the wheel X' of the other truck against the rail Z, the wheels of the corresponding main trucks being correspondingly positioned with respect to the said tracks. In other words, the wheels A of the truck B (see Fig. 6) will assume the same position with respect to the rail Z as does the wheel X with respect to the rail Y; and, on the other hand, the wheels A' of the trucks B' will assume the same position with respect to the rail Y as does the wheel X' with respect to the rail Z. As a result, equal numbers of wheels of the trucks as a whole are held against both track rails, not firmly or rigidly, but yieldingly so that an "elastic or flexible" truck structure is provided. This displacement of the trucks is due to the fact that when the longer arm 14$^a$, acted upon by the weight of the car body, displaces the wheel X in Fig. 1, laterally, as shown, and by consequence the car body, owing to the connection of the wheels X and X' and their adjuncts with the car body, the main truck is similarly displaced laterally owing to the connection of the king-bolts of the main truck with the said car body.

In rounding a curve, the outer wheels of the main trucks will of course have a tendency to bear firmly against the outer rail. But, whereas, heretofore, this bearing has been intermittent or in the nature of repeated thrusts against the said outer rail, in the present instance, the inner wheels of the auxiliary trucks bear against the inner rail and hold the outer wheels of the main trucks firmly and permanently against the outer rail, so that they will run smoothly therealong.

What is claimed is:—

1. In a railway car truck structure, weight imposed means for laterally, relatively displacing the trucks with respect to the track rails.

2. In a railway car truck structure, relatively displaceable truck sections, and means tending to relatively center said sections, the said sections being normally relatively laterally displaced.

3. In a railway car truck structure, main trucks relatively fixed with respect to the car body, and auxiliary trucks relatively displaceable with respect to the said body and weight imposed means acting to relatively center the auxiliary trucks with respect to the car body and relatively displace the wheels of said trucks with respect to the track rails.

4. In a railway car truck structure, main trucks relatively fixed with respect to the car body and auxiliary trucks relatively displaceable with respect to the car body, said auxiliary trucks being relatively reversed, and means embodied in each of said auxiliary trucks tending to displace the wheels thereof with respect to the track rails.

5. In a railway car truck structure, main trucks relatively fixed with respect to the car body, and auxiliary trucks relatively displaceable with respect to the car body, said auxiliary trucks being relatively reversed, and weight imposed means embodied in each of said auxiliary trucks tending to displace the wheels thereof with respect to the track rails.

6. In a railway car truck structure, relatively reversed trucks and means embodied in each truck tending to displace the wheels thereof with respect to the track rails, said means acting in opposition in adjacent trucks.

7. In a railway car truck structure, main trucks relatively fixed with respect to the car body, and auxiliary trucks relatively displaceable with respect to the car body, each of said latter trucks comprising relatively displaceable sections and means interposed between the sections tending to relatively displace the same.

8. In a railway car truck structure, a truck embodying relative displaceable sections, arms of unequal length pivoted to one section, bearing interposed between the arms and the other sections tending to center the sections against the tendency of the longer one of the arms to displace the sections.

9. In a railway car truck structure, main trucks relatively fixed with respect to the car body, and auxiliary trucks relatively displaceable laterally and also vertically with respect to the car body, and means embodied in the auxiliary trucks tending to relatively displace the same with respect to the car body.

10. In a railway car truck structure, the combination with the main trucks, of auxiliary trucks associated therewith and comprising each a relatively fixed member, a truck frame, wheels carried by the frame, the said frame having spaced bearing portions, arms pivoted to the relatively fixed member, rollers disposed upon the bearing portions of the truck frame, and bearing heads upon the arms resting upon the rollers.

11. In a railway car truck structure, the combination with the main trucks, of auxiliary trucks associated therewith and comprising each a relatively fixed member, a truck frame, wheels carried by the frame, the said frame having spaced bearing portions, arms pivoted to the relatively fixed member, rollers disposed upon the bearing portions of the truck frame, bearing heads upon the arms resting upon the rollers, saddles slidably fitted upon the arms above the bearing heads carried thereby, and springs interposed between the saddles and the relatively fixed member.

12. In a railway car truck structure, the combination with the main trucks, of auxiliary trucks associated therewith and comprising each a relatively fixed member, a truck frame, wheels carried by the frame, the said frame having spaced bearing portions, arms pivoted to the relatively fixed member, rollers disposed upon the bearing portions of the truck frame, and bearing heads upon the arms resting upon the rollers, one of the said arms being of greater length than the other said arm whereby the truck frame and its wheels will be relatively laterally displaced with respect to the said fixed member.

In testimony that I claim the foregoing as my own, I have hereto affixed my signature in the presence of two witnesses.

CHARLES W. UNDERWOOD.

Witnesses:
C. E. DOYLE,
C. E. PREINKERT.